US012124336B2

(12) United States Patent
Hara et al.

(10) Patent No.: US 12,124,336 B2
(45) Date of Patent: Oct. 22, 2024

(54) DATA ACQUISITION OF SNAPSHOTS

(71) Applicant: Hitachi, Ltd., Tokyo (JP)

(72) Inventors: Akihiro Hara, Tokyo (JP); Takahiro Yamamoto, Tokyo (JP); Hideo Saito, Tokyo (JP); Takanobu Suzuki, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/120,445

(22) Filed: Mar. 13, 2023

(65) Prior Publication Data

US 2024/0045766 A1 Feb. 8, 2024

(30) Foreign Application Priority Data

Aug. 3, 2022 (JP) ................................. 2022-124119

(51) Int. Cl.
*G06F 11/14* (2006.01)
*G06F 16/11* (2019.01)

(52) U.S. Cl.
CPC ...... *G06F 11/1451* (2013.01); *G06F 11/1456* (2013.01); *G06F 11/1464* (2013.01); *G06F 16/128* (2019.01); *G06F 2201/84* (2013.01)

(58) Field of Classification Search
CPC ............ G06F 11/1451; G06F 11/1456; G06F 11/1464; G06F 16/128; G06F 2201/84; G06F 11/3034; G06F 11/3055
See application file for complete search history.

(56) References Cited

U.S. PATENT DOCUMENTS

| 7,428,657 B2 * | 9/2008 | Yamasaki ........... G06F 11/2082 714/6.3 |
| 8,037,267 B2 * | 10/2011 | Jinno ..................... G06F 1/3268 707/649 |
| 9,170,749 B2 * | 10/2015 | Okada .................... G06F 3/0605 |
| 9,696,940 B1 * | 7/2017 | Neumann ............. G06F 3/0604 |
| 2008/0168218 A1 * | 7/2008 | Arakawa ............. G06F 11/1471 711/112 |
| 2010/0023716 A1 | 1/2010 | Nemoto et al. |
| 2015/0161009 A1 * | 6/2015 | Nakagawa .......... G06F 11/1469 714/6.23 |
| 2019/0215358 A1 | 7/2019 | Kobayashi et al. |

(Continued)

FOREIGN PATENT DOCUMENTS

| JP | 2010-026939 A | 2/2010 |
| WO | 2018/154698 A1 | 8/2018 |
| WO | 2019/026222 A1 | 2/2019 |

OTHER PUBLICATIONS

Japanese Office Action received in corresponding Japanese Application No. 2022-124119 dated Jul. 16, 2024.

*Primary Examiner* — Tasnima Matin
(74) *Attorney, Agent, or Firm* — MATTINGLY & MALUR, PC

(57) ABSTRACT

In a storage system that acquires data from a storage system via a network, in the storage system, a snapshot 108 with respect to a predetermined volume is managed, the storage system includes a CPU, and the CPU is configured to receive an acquisition instruction of data of a first snapshot of the predetermined volume and acquire at least a part of data of a difference between the first snapshot and a second snapshot from the storage system when data of the second snapshot of the predetermined volume is acquired.

13 Claims, 18 Drawing Sheets

(56) References Cited

U.S. PATENT DOCUMENTS

2020/0073584 A1 3/2020 Tsuchiya et al.
2022/0342551 A1* 10/2022 Bora ................... G06F 11/1435
2023/0409522 A1* 12/2023 Kashi Visvanathan ... H04L 9/14

* cited by examiner

FIG. 5

| VIRTUAL VOLUME ID | LBA | STATUS | STORAGE DESTINATION TYPE | STORAGE DESTINATION ID | STORAGE DESTINATION VOLUME | STORAGE DESTINATION LBA |
|---|---|---|---|---|---|---|
| 1 | 0~255 | REFLECTED | STORAGE DEVICE | - | STORAGE DEVICE 1 | 0~255 |
| 1 | 256~511 | REFLECTED | STORAGE DEVICE | - | STORAGE DEVICE 1 | 256~511 |
| 1 | 512~767 | REFLECTED | STORAGE DEVICE | - | STORAGE DEVICE 1 | 512~767 |
| ... | ... | ... | ... | ... | ... | ... |

FIG. 6

| VIRTUAL VOLUME ID | LBA | STATUS | STORAGE DESTINATION TYPE | STORAGE DESTINATION ID | STORAGE DESTINATION VOLUME | STORAGE DESTINATION LBA |
|---|---|---|---|---|---|---|
| 1 | 0~255 | REFLECTION REQUIRED | CONNECTION DESTINATION Snapshot | EXTERNAL STORAGE 1 | Snapshot2 | 0~255 |
| 1 | 256~511 | REFLECTION REQUIRED | CONNECTION DESTINATION Snapshot | EXTERNAL STORAGE 1 | Snapshot2 | 256~511 |
| 1 | 512~767 | REFLECTION REQUIRED | CONNECTION DESTINATION Snapshot | EXTERNAL STORAGE 1 | Snapshot2 | 512~767 |
| ... | ... | ... | ... | ... | ... | ... |

FIG. 7

| VIRTUAL VOLUME ID | LBA | READ PRESENCE / ABSENCE |
|---|---|---|
| 1 | 0~255 | ABSENCE |
| 1 | 256~511 | ABSENCE |
| 1 | 512~767 | ABSENCE |
| ... | ... | ... |

FIG. 8

| VIRTUAL VOLUME ID | LBA | READ PRESENCE / ABSENCE |
|---|---|---|
| 1 | 0~255 | PRESENCE |
| 1 | 256~511 | PRESENCE |
| 1 | 512~767 | ABSENCE |
| ... | ... | ... |

FIG. 9

| VIRTUAL VOLUME ID (901) | CONNECTION DESTINATION STORAGE (902) | CONNECTION DESTINATION SNAPSHOT ID (903) |
|---|---|---|
| 1 | EXTERNAL STORAGE 1 | Snapshot1 |
| ... | ... | ... |

| Snapshot ID (701) | LBA (702) | STORAGE DESTINATION STORAGE DEVICE ID (703) | STORAGE DESTINATION LBA (704) |
|---|---|---|---|
| 1 | 0~255 | 1 | 0~255 |
| 1 | 256~511 | 1 | 256~511 |
| 1 | 512~767 | 1 | 512~767 |
| ... | ... | ... | ... |

| CREATION SOURCE VOLUME ID (801) | SnapshotID (802) | CREATION DATE AND TIME (803) |
|---|---|---|
| 1 | 1 | 2022/3/1 0:00 |
| 1 | 2 | 2022/3/8 0:00 |
| ... | ... | ... |

| VOLUME TYPE | ID | LBA | STATUS | STORAGE DESTINATION TYPE | STORAGE DESTINATION ID | STORAGE DESTINATION LBA |
|---|---|---|---|---|---|---|
| Snapshot | 2 | 0〜255 | REFLECTED | STORAGE DEVICE | 1 | 0〜255 |
| Snapshot | 2 | 256〜511 | REFLECTED | STORAGE DEVICE | 1 | 256〜511 |
| Snapshot | 2 | 512〜767 | REFLECTED | STORAGE DEVICE | 1 | 512〜767 |
| ... | ... | ... | ... | ... | ... | ... |

FIG. 21

| SNAPSHOT ID | CONNECTION DESTINATION STORAGE | CONNECTION DESTINATION SNAPSHOT ID |
|---|---|---|
| 1 | EXTERNAL STORAGE 1 | Snapshot1 |
| ... | ... | ... |

DATA ACQUISITION OF SNAPSHOTS

CROSS-REFERENCE TO RELATED APPLICATION

The present application claims priority from Japanese application JP2022-124119, filed on Aug. 3, 2022, the contents of which is hereby incorporated by reference into this application.

BACKGROUND OF THE INVENTION

1. Field of the Invention

The present invention relates to a technology of acquiring required data from an external storage system connected via a network.

2. Description of Related Art

For example, use cases for secondary use of data of a main business operated on-premises are expanding, and an instance access function that enables immediate access to on-premises data from the cloud is considered.

As a use case for secondary use of data, for example, there is a case of continuous analysis of changes over time. In such cases, the same analysis process may be executed on snapshots at different points in time. When on-premises data is read from the cloud side, the latency is high. Therefore, in order to speed up the analysis process, it is required to copy and store the entire data on the cloud.

For example, as a technology relating to cloud bursting, a technology is known that improves I/O performance in the cloud while suppressing storage costs by narrowing down data to be copied into the cloud based on the access frequency or the like of a volume (for example, see WO2018/154698).

For example, in the case of continuous analysis of changes over time in the cloud, the analysis process is performed on snapshots at different points in time. However, when the analysis process is performed on the data of the snapshot at each point in time, whenever the snapshot to be processed is switched, it is required to copy the entire data of the snapshot from the on-premises to the cloud side, and thus it takes a long period of time for copying the data, so that it takes a long period of time for the analysis process.

The invention is conceived in view of the above circumstances, and the purpose thereof is to provide a technology of capable of acquiring required data quickly.

SUMMARY OF THE INVENTION

In order to achieve the object, provided is a data acquisition apparatus according to a first aspect that acquires data from an external storage system via a network, in which in the external storage system, a snapshot with respect to a predetermined volume is managed, the data acquisition apparatus includes a processor, and the processor receives an acquisition instruction of data of a first snapshot of the predetermined volume, and acquires at least a part of data of a difference between the first snapshot and a second snapshot from the external storage system, when data of the second snapshot of the predetermined volume is already acquired.

According to the invention, required data can be quickly acquired.

BRIEF DESCRIPTION OF THE DRAWINGS

FIG. 5 is a diagram illustrating a state of a virtual volume address management table according to the first embodiment at the time of initial copy completion;

FIG. 6 is a diagram for explaining the state of the virtual volume address management table according to the first embodiment at the time of connection destination snapshot switching;

FIG. 7 is a diagram illustrating the state of a read presence/absence management table according to the first embodiment at the time of initial copy completion;

FIG. 8 is a diagram illustrating a state of the read presence/absence management table according to the first embodiment at the time of connection destination snapshot switching;

FIG. 9 is a configuration diagram of a connection destination snapshot history management table according to the first embodiment;

FIG. 10 is a configuration diagram of a stored data management table according to the first embodiment;

FIG. 11 is a configuration diagram of a snapshot management table according to the first embodiment;

FIG. 20 is a diagram illustrating a state after acquisition of data of the second snapshot in a volume address management table according to the second embodiment;

FIG. 21 is a configuration diagram of a connection destination snapshot history management table according to the second embodiment;

DESCRIPTION OF EMBODIMENTS

The embodiments are described with reference to the drawings. It should be noted that the embodiments described below do not limit the invention according to the claims, and all of the elements described in the embodiments and their combinations are not essential to the solution of the invention.

In the following explanation, a process may be described with a "program" as a subject of an operation, but the program is executed by a processor (for example, a central processing unit (CPU)) to perform a predetermined process by appropriately using a storage resource (for example, a memory) and/or a communication interface device (for example, a network interface card (NIC)). Therefore, the subject of the process may be considered as the program. A process described with a program as a subject of an operation may be a process performed by a processor or a computer having the processor.

Also, in the following description, the information may be expressed in terms of "AAA table", but the information may be expressed in any data structure. That is, an "AAA table" can be referred to as "AAA information" to indicate that the information does not depend on the data structure.

Figure 1:
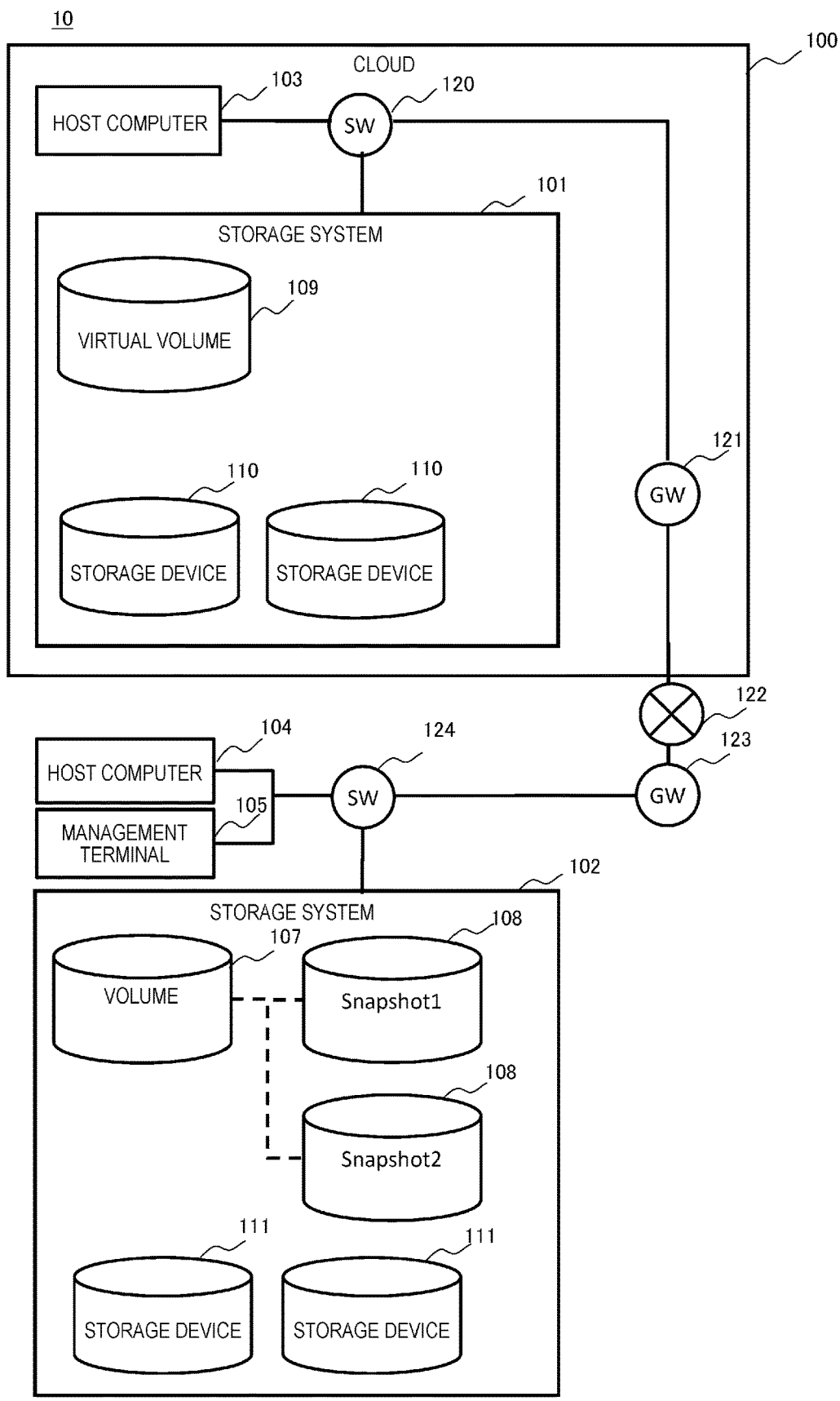
FIG. 1 is an overall schematic diagram of a computer system according to a first embodiment.

FIG. 1 is an overall schematic diagram of a computer system according to a first embodiment.

A computer system 10 includes a storage system 101 as an example of a data acquisition apparatus, a storage system 102 as an example of an external storage system, a host computer 103, a host computer 104, a management terminal 105, a switch (SW) 120, a gateway (GW) 121, a network 122, a gateway 123, and a switch 124.

The storage system 101, the host computer 103, the switch 120, and the gateway 121 are provided in a cloud 100. The storage system 102, the host computer 104, the management terminal 105, the gateway 123, and the switch 124 may be provided in a data center (on-premises) of a company that executes the business, and a part thereof may be provided in a cloud different from the cloud 100.

The switch 120 relays communication between apparatus in each item of apparatus of the cloud 100 and apparatus on the network 122 side than the gateway 121. The gateway 121 is connected to the switch 120 and the network 122 and relays communication between the switch 120 side and the network 122 side.

The host computer 103 uses data of a volume (including a virtual volume) of the storage system 101 and executes various processes (for example, an analysis process).

The storage system 101 includes a virtual volume 109 and one or more storage devices 110. The virtual volume 109 stores data used in the process of the host computer 103. A storage area of the virtual volume 109 is based on a storage area of the storage device 110 of the storage system 101 and a storage area of another (external) storage system (the storage system 102).

The network 122 is, for example, a wide area network (WAN).

The gateway 123 is connected to the network 122 and the switch 124 and relays communication between the network 122 side and the switch 124 side. The switch 120 relays communication between apparatus in the host computer 104, the management terminal 105, the storage system 102, and each item of apparatus of the cloud 100.

The host computer 104 uses the volume provided from the storage system 102 and executes a process relating to the business (business process). The management terminal 105 is a computer used by a manager who manages the storage systems 101 and 102 and performs various instructions to the storage systems 101 and 102.

The storage system 102 is a storage system that manages data relating to the business and includes a volume 107 and a storage device 111. The volume 107 stores data used in the business process by the host computer 104 and data generated in the business process. The storage area of the volume 107 is based on the storage area of the storage device 111. According to the present embodiment, the storage system 102 stores a snapshot 108 indicating a state of the volume 107 at a predetermined point in time.

In the computer system 10, when the host computer 103 uses data of the business process at a predetermined point in time that is stored in the storage system 102 to perform a process, basically, the host computer 103 copies the data of the snapshot indicating the data of the business process at a predetermined point in time of the processing target to the storage system 101 and uses the data.

Figure 2:
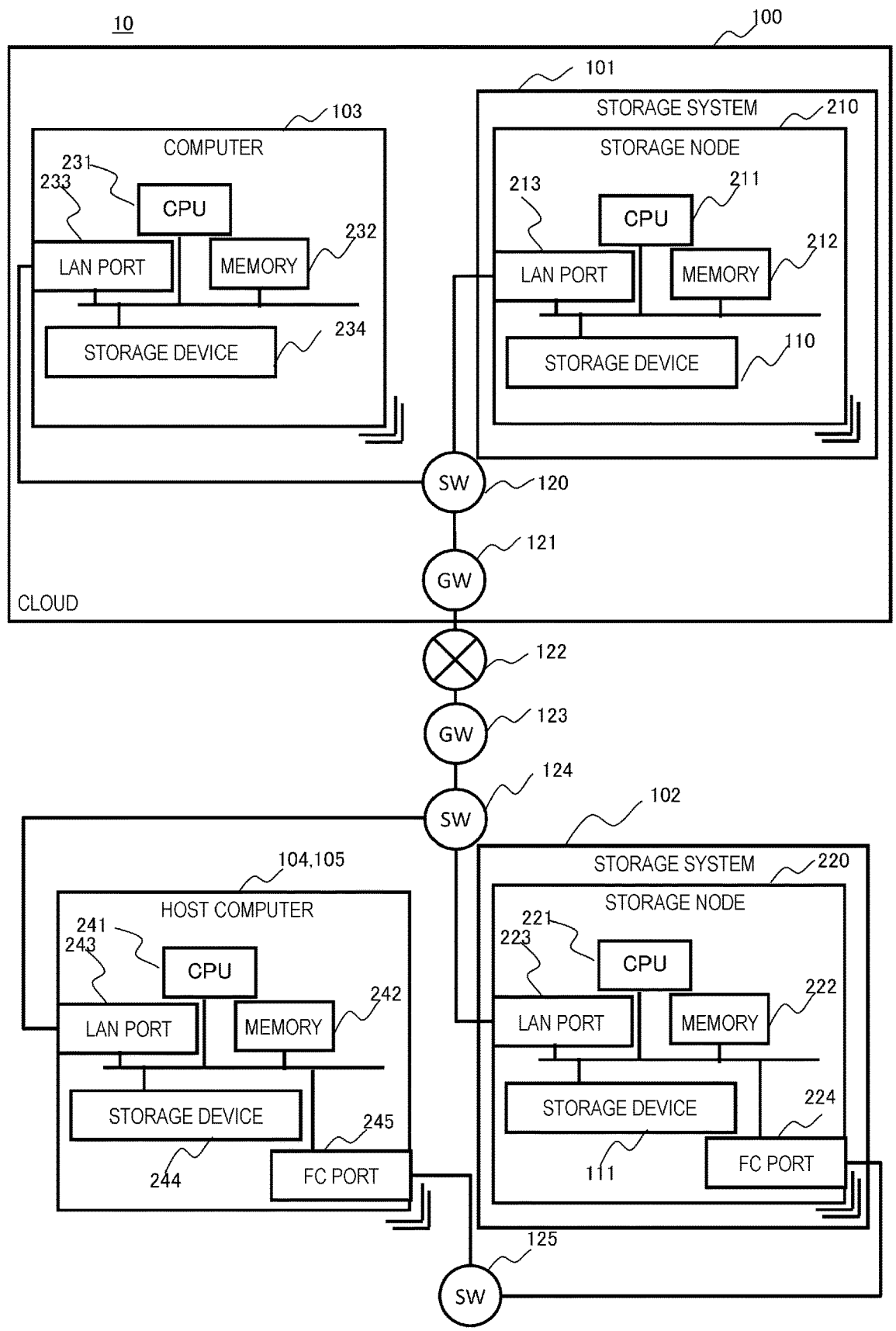
FIG. 2 is a hardware configuration diagram of the computer system according to the first embodiment.

FIG. 2 is a hardware configuration diagram of a computer system according to the first embodiment.

The computer system 10 includes the storage system 101, the storage system 102, one or more host computers 103, the host computer 104, the management terminal 105, the switch 120, the gateway 121, the gateway 123, the switch 124, and a switch 125. The storage system 102 and the host computer 104 are connected to each other via the switch 125.

The storage system 101 includes one or more storage nodes 210. The storage node 210 is an example of a computer and includes a CPU 211 as an example of a processor, a memory 212, a LAN port 213, and the storage devices 110.

The CPU 211 executes various processes according to a program stored in the memory 212 and/or the storage devices 110.

The memory 212 is, for example, a random access memory (RAM) and stores a program to be executed by the CPU 211 and required information.

The storage device 110 is, for example, a hard disk drive (HDD), a solid state drive (SSD), and a non-volatile memory express (NVMe) storage and stores a program to be executed by the CPU 211 and data to be used by the CPU 211. When the cloud is Amazon Web Services (AWS: Amazon is a registered trademark), the storage device 110 may be Amazon Elastic Block Store (EBS).

The LAN port 213 is, for example, an interface for a wired LAN card, a wireless LAN card, or the like and communicates with other apparatus (for example, the host computer 103 and the storage system 102).

The host computer 103 includes a CPU 231, a memory 232, a LAN port 233, and a storage device 234.

The storage system 102 includes one or more storage nodes 220. The storage node 220 includes a CPU 221 as an example of a processor, a memory 222, a LAN port 223, an FC port 224, and the storage device 111. In addition, the configuration having the same name as the storage node 210 has the same function.

The FC port 224 is an interface for connection to other apparatus (the host computer 104) via a fiber channel (FC).

The host computer 104 (the management terminal 105) includes a CPU 241, a memory 242, a LAN port 243, a storage device 244, and an FC port 245.

In addition, the storage systems 101 and 102 may be configured with a storage array or may be configured with a software defined storage (SDS). In addition, the storage system 102 and the host computer 104 are connected to each other via an FC but may not be connected to each other via an FC.

Figure 3:
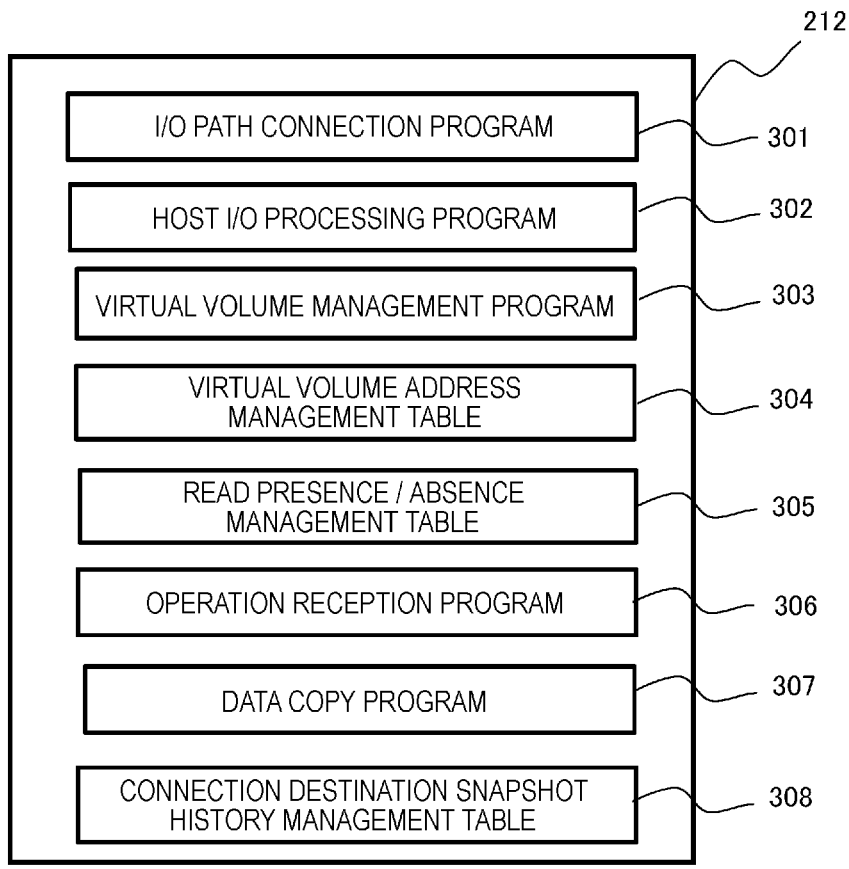
FIG. 3 is a configuration diagram of a memory of a cloud-side storage system according to the first embodiment.

FIG. 3 is a configuration diagram of a memory of a cloud-side storage system according to the first embodiment.

The memory 212 of the storage system 101 on the cloud 100 side stores an I/O path connection program 301, a host I/O process program 302, a virtual volume management program 303, a virtual volume address management table 304, a read presence/absence management table 305, an operation reception program 306, a data copy program 307, and a connection destination snapshot history management table 308.

The I/O path connection program 301 is executed by the CPU 211 and is connected to a path to a snapshot of an external storage (the storage system 102) to enable I/O to the snapshot. The host I/O process program 302 is executed by the CPU 211 and processes I/O to a virtual volume from the host computer 103. The virtual volume management program 303 is executed by the CPU 211 and performs a process of managing a virtual volume (virtual volume management process) or the like.

The operation reception program 306 is executed by the CPU 211 to receive the operation instruction from a user (for example, from the management terminal 105) and control the execution of a process corresponding to the instruction or the like. The data copy program 307 is executed by the CPU 211 to perform a copy process of reading data of a logical block address (LBA) of a designated volume of the storage system 102 by using a small computer system interface (SCSI) command and writing the data into the LBA of the designated volume of the storage system 101.

Figure 4:
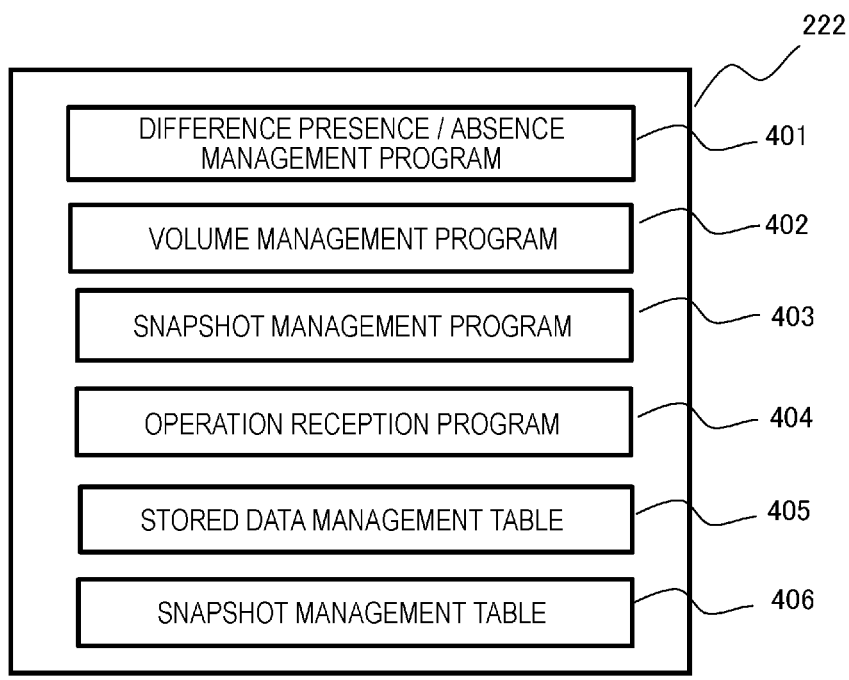
FIG. 4 is a configuration diagram of a memory of a storage system that manages business data according to the first embodiment.

FIG. 4 is a configuration diagram of a memory of a storage system that manages the data of the business according to the first embodiment.

The memory 222 of the storage system 102 stores a difference presence/absence management program 401, a volume management program 402, a snapshot management program 403, an operation reception program 404, a stored data management table 405, and a snapshot management table 406.

The difference presence/absence management program 401 is executed by the CPU 221 to perform a difference presence/absence management process of checking whether there is a difference in predetermined areas of two target snapshots. The volume management program 402 is executed by the CPU 221 to manage the stored data management table 405 and execute an I/O process on the volume. The snapshot management program 403 is executed by the CPU 221 to create a snapshot in the volume and manage the snapshot management table 406. The operation reception program 404 is executed by the CPU 221 to receive an operation instruction from the user and to control the execution of a process corresponding to the instruction.

Next, the virtual volume address management table 304 is described.

FIG. 5 is a diagram illustrating a state of a virtual volume address management table according to the first embodiment at the time of initial copy completion and FIG. 6 is a diagram illustrating a state of the virtual volume address management table according to the first embodiment at the time of connection destination snapshot switching.

The virtual volume address management table 304 is a table for managing a storage destination of data with respect to storage areas in a predetermined size of the virtual volume (for example, for 256 logical blocks) and stores an entry per storage area in a predetermined size of the virtual volume (for example, for 256 logical blocks). The entries of the virtual volume address management table 304 include fields of a virtual volume ID 501, an LBA 502, a status 503, a storage destination type 504, a storage destination ID 505, a storage destination volume 506, and a storage destination LBA 507.

In the virtual volume ID 501, IDs of the virtual volumes corresponding to the entries (virtual volume IDs) are stored. In the LBA 502, ranges of the logical block addresses (LBAs) of the storage areas corresponding to the entries are stored.

In the status 503, statuses of the storage areas corresponding to the entries are stored. Here, examples of the status include a reflected status indicating that data of a storage area corresponding to an entry is reflected to (acquired by) the storage device 110 of the storage system 101 and a reflection required status indicating that data of a storage area corresponding to an entry is required to be reflected to the storage device 110 of the storage system 101.

In the storage destination type 504, types of storage destinations in which data of storage areas corresponding to the entries are actually stored (storage destination type) are stored. Examples of the storage destination type include a storage device when the storage destination is the storage device 110 of the storage system 101 of the cloud 100 and a connection destination snapshot when the storage destination is a snapshot of the storage system 102. In the storage destination ID 505, IDs of storage destinations in which data of storage areas corresponding to entries are stored (storage destination IDs) are stored. As the storage destination ID, in a case of the storage system 102, an ID of the storage system 102 is stored.

In the storage destination volume 506, volume names of volumes in which data of storage areas corresponding to entries are actually stored are stored. In the storage destination LBA 507, ranges of logical block addresses in volumes in which data of areas corresponding to entries are stored are stored.

For example, at the time of initial copy completion, that is, when data of a snapshot to a volume is first copied to the storage system 101, the virtual volume address management table 304 is in a state as illustrated in FIG. 5. For example, in an entry on the first row, data in a range of logical block addresses of 0 to 255 of a virtual volume of which the virtual volume ID is 1 are reflected to the storage device 110 of the storage system 101, the storage destination type is a storage device, that is, a storage device of the storage system 101, the storage destination volume is Storage Device 1, and the range of the logical block addresses of the storage destination is 0 to 255.

In addition, immediately after the connection destination of the virtual volume is switched to another snapshot, the virtual volume address management table 304 is in a state as illustrated in FIG. 6. For example, in the entry on the first row, data in a range of logical block addresses of 0 to 255 of the virtual volume of which the virtual volume ID is 1 is required to be reflected to the storage device 110 of the storage system 101, the storage destination type is a connection destination snapshot, that is, a snapshot of the storage system 102, the storage destination is External Storage 1, that is, the storage system 102, the storage destination volume is Snapshot 2 of the switch destination, and the range of the logical block addresses of the storage destination is 0 to 255. In addition, when the virtual volume is first connected to the snapshot, the ID of the first snapshot (for example, Snapshot 1) is in a state of being stored in the storage destination ID 505 in the state as illustrated in FIG. 6.

Next, the read presence/absence management table 305 is described.

FIG. 7 is a diagram illustrating a state of the read presence/absence management table according to the first embodiment at the time of initial copy completion, and FIG.

8 is a diagram illustrating a state of the read presence/absence management table according to the first embodiment at the time of connection destination snapshot switching.

The read presence/absence management table 305 is a table for managing the presence/absence of reading per storage area in a predetermined size of the virtual volume (for example, for 256 logical blocks) and storing entries per storage area in the predetermined size of the virtual volume. The entries of the read presence/absence management table 305 include a virtual volume ID 601, an LBA 602, and read presence/absence 603.

In the virtual volume ID 601, virtual volume IDs of virtual volumes corresponding to entries are stored. In the LBA 602, ranges of logical block addresses of storage areas corresponding to entries are stored. In the read presence/absence 603, presence/absence of reading by the host computer 103 with respect to data of storage areas corresponding to entries (read presence/absence) is stored.

For example, at the time of initial copy completion, that is, when data of a snapshot with respect to a volume is first copied to the storage system 101, the read presence/absence management table 305 is in a state as illustrated in FIG. 7. That is, the read presence/absence 603 of each entry is set as absence indicating that reading is not performed (read absence).

In addition, immediately after the connection destination of the virtual volume is switched to another snapshot, the read presence/absence management table 305 is in a state in which a read presence/absence state to the snapshot before switching is maintained as illustrated in FIG. 8. For example, in the entry on the first row, for the data in the range of logical block addresses of 0 to 255 of the virtual volume of which the virtual volume ID is 1, presence indicating that the reading is performed (read presence) is set.

Next, the connection destination snapshot history management table 308 is described.

FIG. 9 is a configuration diagram illustrating a connection destination snapshot history management table according to the first embodiment.

The connection destination snapshot history management table 308 is a table for managing snapshots of connection destinations of virtual volumes (snapshot volumes) and stores entries per virtual volume. The entries of the connection destination snapshot history management table 308 include fields of a virtual volume ID 901, a connection destination storage 902, and a connection destination snapshot ID 903.

In the virtual volume ID 901, IDs of virtual volumes corresponding to entries are stored. In the connection destination storage 902, IDs of storages of connection destinations of virtual volumes corresponding to entries are stored. In the connection destination snapshot ID 903, IDs of snapshots of connection destinations of virtual volumes corresponding to entries are stored.

Next, the stored data management table 405 is described.

FIG. 10 is a configuration diagram of a stored data management table according to the first embodiment.

The stored data management table 405 is a table for managing storage destinations of the volumes of the snapshots in the storage system 102 and stores entries per storage area in a predetermined size of a volume (for example, for 256 logical blocks).

The entries of the stored data management table 405 include fields of a snapshot ID 701, an LBA 702, a storage destination storage device ID 703, and a storage destination LBA 704.

In the snapshot ID 701, IDs of snapshots corresponding to entries (snapshot IDs) are stored. In the LBA 702, ranges of logical block addresses of storage areas corresponding to entries are stored. In the storage destination storage device ID 703, IDs of storage devices in which data of storage areas corresponding to entries is stored are stored. In the storage destination LBA 704, ranges of logical block addresses of storage devices in which data of storage areas corresponding to entries is stored are stored. In addition, an LBA of a storage destination may be an LBA of an area virtualized based on Thin provisioning or may be an LBA of an area made redundant by Redundant Array of Independent (or Inexpensive) Disks (RAID) or Eradure Coding.

Next, the snapshot management table 406 is described.

FIG. 11 is a configuration diagram of a snapshot management table according to the first embodiment.

The snapshot management table 406 is a table for managing snapshots with respect to volumes and stores entries per snapshot of each volume. The entries of the snapshot management table 406 include fields of a creation source volume ID 801, a Snapshot ID 802, and creation date and time 803.

In the creation source volume ID 801, IDs of volumes of creation sources of snapshots corresponding to entries are stored. In the Snapshot ID 802, IDs of snapshots corresponding to entries are stored. In the creation date and time 803, date and time when snapshots corresponding to entries are created are stored.

Next, a user operation procedure when using the computer system 10 is described.

Figure 12:
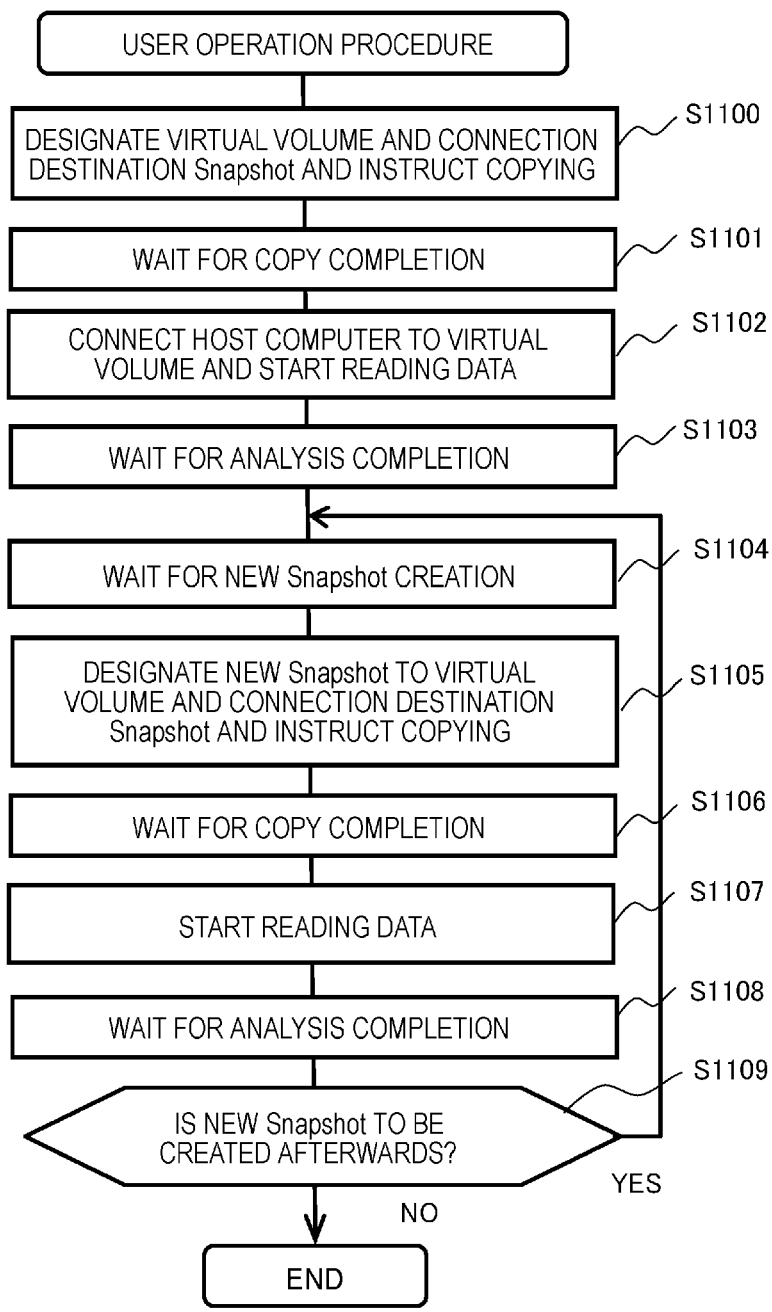
FIG. 12 is a flowchart of a user's operation procedure in using the computer system according to the first embodiment.

FIG. 12 is a flowchart illustrating a user operation procedure in using the computer system according to the first embodiment. FIG. 12 illustrates a procedure when a virtual volume for copying data of a snapshot (an example of a second snapshot) to be used in an analysis process of the host computer 103 is created in the storage system 101 in the computer system 10, the data of the snapshot is copied to the virtual volume, an analysis process is performed by using the virtual volume, data of another snapshot (an example of a first snapshot) to be used in the next analysis process is copied, and an analysis process is performed.

First, a user designates a virtual volume and a snapshot of a connection destination connected to the virtual volume (the second snapshot) with respect to the management terminal 105 and performs copy instruction of the snapshot (S1100). In contrast, the management terminal 105 transmits a copy instruction (acquisition instruction) including the virtual volume and the snapshot of the connection destination to the storage system 101.

The user waits for a response of the copy completion from the storage system 101 to the management terminal 105 (S1101).

Next, when the response of the copy completion is returned, the management terminal 105 connects the host computer 103 to be used for the analysis process to the virtual volume and causes the host computer 103 to start reading data from the virtual volume and execute the analysis process (S1102).

The user waits for a response of analysis completion from the host computer 103 to the management terminal 105 (S1103).

Thereafter, the user waits until a snapshot to be a next process target is created in the storage system 102 and the analysis process is executed by using the snapshot (S1104).

Next, the user designates a virtual volume and a new snapshot of a connection destination newly connected to the virtual volume (the first snapshot) for the management terminal 105 and instructs copying of this snapshot (S1105). In contrast, the management terminal 105 transmits the copy instruction including the snapshot of the virtual volume and the connection destination to the storage system 101.

The user waits for a response of the copy completion from the storage system 101 to the management terminal 105 (S1106).

Next, when the response of the copy completion is returned, the management terminal 105 causes the host computer 103 to be used for the analysis process to start reading data from the virtual volume and execute the analysis process (S1107).

The user waits for a response of the analysis completion from the host computer 103 to the management terminal 105 (S1108).

Thereafter, when the user subsequently creates the snapshot to be a target of the next analysis process in the storage system 102 (S1109: YES), the process proceeds to Step S1104. When the user does not subsequently create the snapshot to be a target of the next analysis process in the storage system 102 (S1109: NO), the process ends.

Next, the virtual volume management process is described.

The virtual volume management process is executed when the operation reception program 306 of the storage system 101 receives the copy instruction including the designation of the virtual volume and the snapshot of the connection destination from the management terminal 105.

Figure 13:
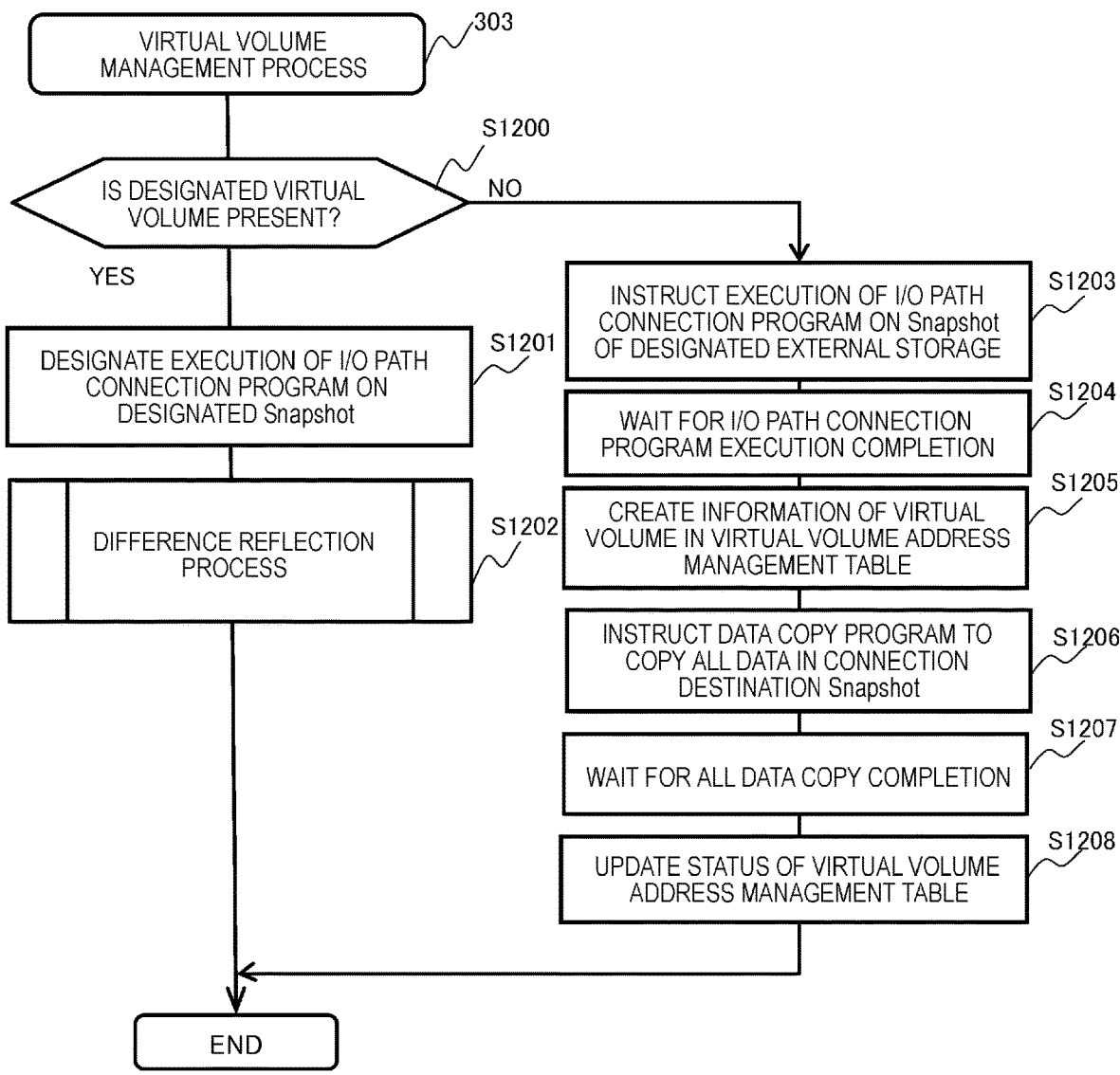
FIG. 13 is a flowchart of a virtual volume management process according to the first embodiment.

FIG. 13 is a flowchart of a virtual volume management process according to the first embodiment.

The virtual volume management program 303 of the storage system 101 (strictly speaking, the CPU 211 that executes the virtual volume management program 303) determines whether the designated virtual volume is present (S1200).

As a result, when the designated virtual volume is present (S1200: YES), the virtual volume management program 303 instructs the execution of the I/O path connection program 301 to connect the designated snapshot (S1201). Accordingly, the I/O path connection program 301 executes the process of connecting the virtual volume to the designated snapshot.

Next, the virtual volume management program 303 designates the designated snapshot ID, executes the difference reflection process (see FIG. 14) (S1202), and ends the process.

Meanwhile, when the designated virtual volume is not present (S1200: NO), the virtual volume management program 303 instructs the execution of the I/O path connection program 301 to connect the designated snapshot (S1203). Accordingly, the I/O path connection program 301 executes the process of connecting the virtual volume to the designated snapshot.

Next, the virtual volume management program 303 waits for the completion of the process by the I/O path connection program 301 (S1204), and thereafter creates the information of the virtual volume designated by the virtual volume address management table 304 (S1205).

Next, the virtual volume management program 303 instructs the data copy program 307 to copy all data of the designated snapshot to the storage device 110 of the storage system 101 (S1206) and waits for all data copy completion (S1207). When the copying of all data is completed, the field of the virtual volume address management table 304 is updated (S1208), and the process ends. Specifically, in Step S1208, the virtual volume management program 303 changes the status 503 of the entry of the designated virtual volume to the reflected status, changes the storage destination type 504 to the storage device, and updates the storage destination volume 506 to the storage device 110 of the storage system 101.

Next, the difference reflection process of Step S1202 is described.

Figure 14:
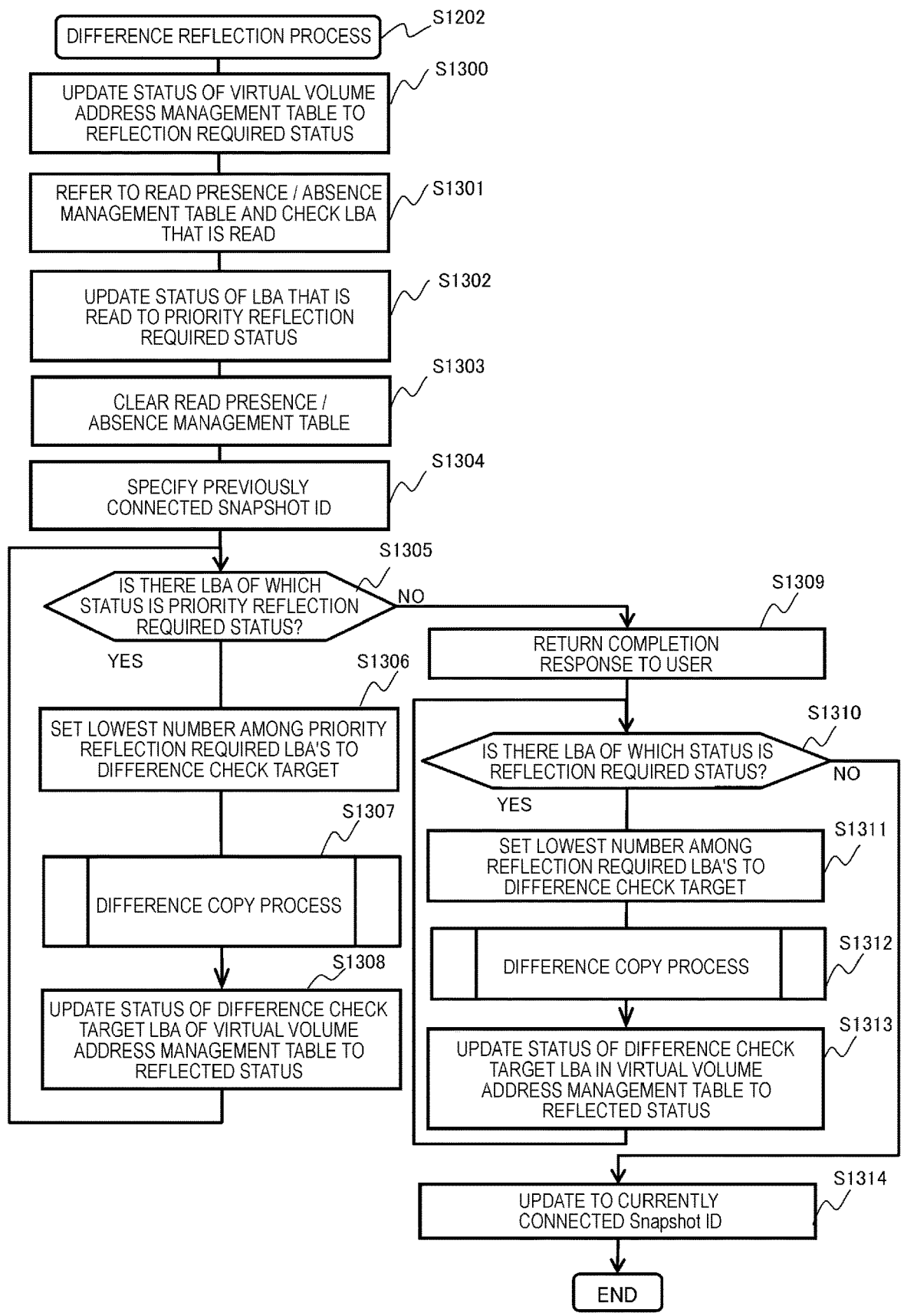
FIG. 14 is a flowchart of a difference reflection process according to the first embodiment.

FIG. 14 is a flowchart of the difference reflection process according to the first embodiment.

The virtual volume management program 303 updates the field of the entry of the designated virtual volume of the virtual volume address management table 304 as illustrated in FIG. 6 (S1300). Specifically, the virtual volume management program 303 updates the status 503 of the entry to the reflection required status, updates the storage destination type 504 to the connection destination snapshot, changes the storage destination ID to the external storage indicating the storage system 102, and changes the storage destination volume 506 to the snapshot after switching.

The virtual volume management program 303 refers to the read presence/absence management table 305, checks the LBA that is read (read presence) (S1301), and updates the status 503 to a priority reflection required status in the entry corresponding to the read LBA of the designated virtual volume of the virtual volume address management table 304 (S1302).

Next, the virtual volume management program 303 clears the read presence/absence 603 of all entries corresponding to the designated virtual volume of the read presence/absence management table 305, that is, sets the read presence/absence 603 to absence (S1303).

Next, the virtual volume management program 303 refers to the connection destination snapshot history management table 308 and specifies the ID of the snapshot previously connected, that is, before switching with respect to the designated virtual volume (S1304).

Next, the virtual volume management program 303 determines whether there is an entry of an LBA in which the status 503 is set to the priority reflection required status, among the entries of the designated virtual volume of the virtual volume address management table 304 (S1305).

As a result, when there is an entry of an LBA in which the status 503 is set to a priority reflection required status (S1305: YES), the virtual volume management program 303 sets an LBA having the lowest number among LBAs set to the priority reflection required status to a target for checking the difference from the data of the same LBA in the snapshot before switching (difference check target) (S1306).

Next, the virtual volume management program 303 designates the snapshot ID of the snapshot of the difference check target, the snapshot ID of the snapshot before switching, and the LBA of the difference check target and instructs the execution of the difference copy process (see FIG. 15) (S1307). Next, the virtual volume management program 303 updates the item of the entry of the LBA as the difference check target of the virtual volume address management table 304 after the difference copy process ends, specifically changes the status 503 to the reflected status, changes the storage destination type 504 to the storage device, updates the storage destination volume 506 to the storage device 110 of the storage system 101 (S1308), and causes the process to proceed to Step S1305.

Meanwhile, when there is not an entry of an LBA of which the status 503 is set to the priority reflection required status (S1305: NO), it means that the differences of data corresponding to all LBAs that are read with respect to the snapshot before switching are reflected. Therefore, even when the difference of data of another LBA is not reflected, it is considered that the influence of the delay on the analysis process is weak, the virtual volume management program 303 returns a response of the copy completion to the management terminal 105 of the user (request source) (S1309). Accordingly, the user can start the analysis process using the data of the snapshot after switching.

Next, the virtual volume management program 303 determines whether there is an entry of an LBA of which the status 503 is set to a reflection required status, among the entries of the designated virtual volume of the virtual volume address management table 304 (S1310).

As a result, when there is an entry of an LBA of which the status 503 is set to a reflection required status (S1310: YES), the virtual volume management program 303 sets an LBA having the lowest number among LBAs set to the reflection required status to a target for checking the difference from the data of the same LBA in the snapshot before switching (difference check target) (S1311).

Next, the virtual volume management program 303 designates the snapshot ID of the snapshot of the difference check target, the snapshot ID of the snapshot before switching, and the LBA of the difference check target and instructs the execution of the difference copy process (see FIG. 15) (S1312). Next, the virtual volume management program 303 updates the item of the entry of the LBA of the difference check target of the virtual volume address management table 304 after the difference copy process ends, specifically changes the status 503 to the reflected status, changes the storage destination type 504 to the storage device, and updates the storage destination volume 506 to the storage device 110 of the storage system 101 (S1313), and causes the process to proceed to Step S1310.

Meanwhile, when there is no entry of an LBA of which the status 503 is set to the reflection required status (S1310: NO), it means that the differences of the data corresponding to all LBAs of the snapshot after switching are reflected, and thus the virtual volume management program 303 updates the connection destination snapshot ID 903 of the entry corresponding to the designated virtual volume of the connection destination snapshot history management table 308 to the ID of the snapshot currently connected, that is, after switching (S1314), and the difference reflection process ends.

Next, the difference copy process of Steps S1307 and S1312 is described.

Figure 15:
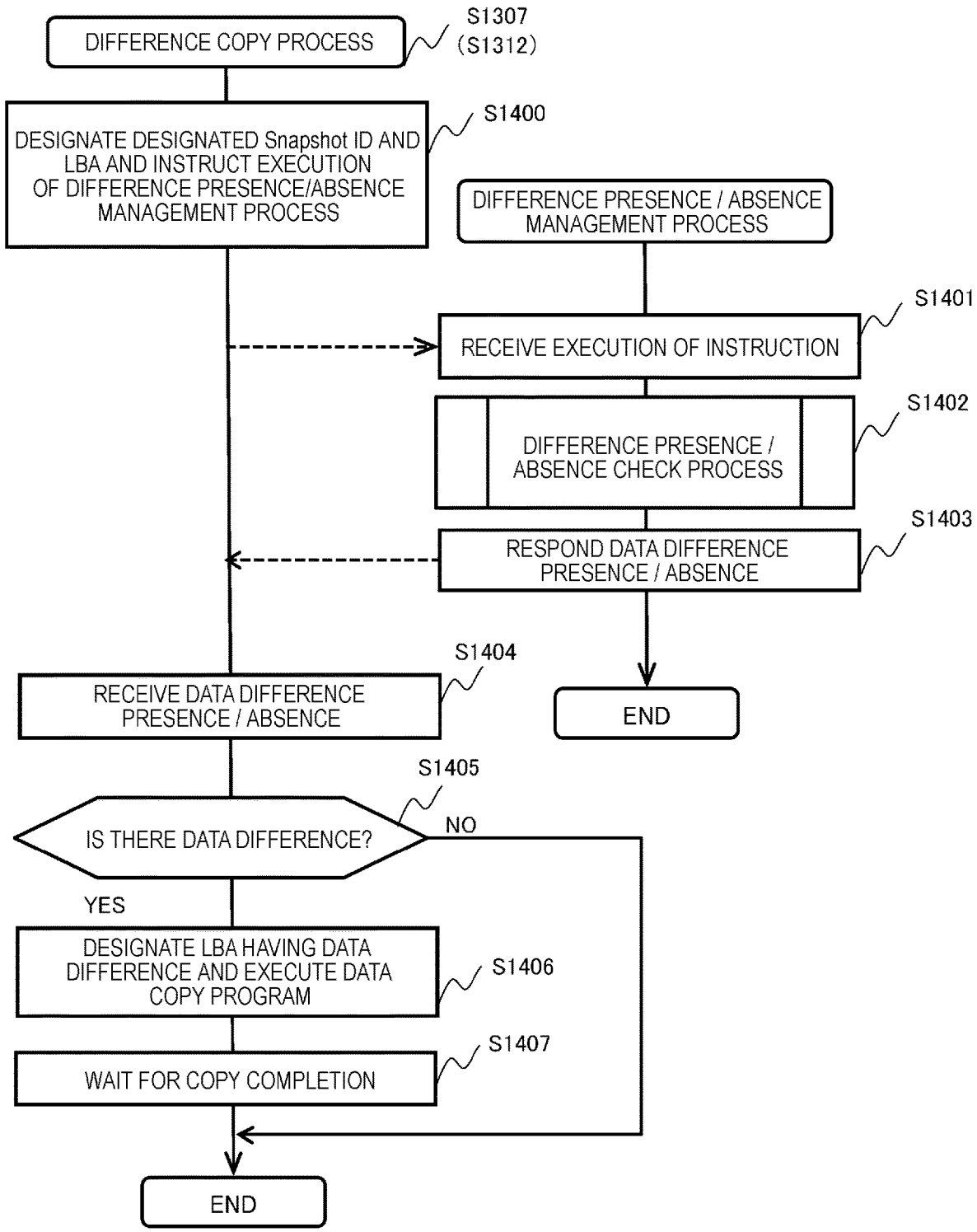
FIG. 15 is a flowchart of a difference copy process according to the first embodiment.

FIG. 15 is a flowchart of a difference copy process according to the first embodiment.

The virtual volume management program 303 designates the snapshot ID of the snapshot of the difference check target, the snapshot ID of the snapshot before switching, and the LBA of the difference check target with respect to the storage system 102 and instructs the execution of the difference presence/absence management process (S1400). Here, the difference presence/absence management process execution instruction to the storage system 102 may be performed by using an application programmable interface (API) of the storage system 102.

As a result, the storage system 102 causes the operation reception program 404 to receive the difference presence/absence management process execution instruction (S1401) and causes the difference presence/absence management program 401 to execute the difference presence/absence check process of checking the difference from the snapshot before switching (see FIG. 16) by using the designated LBA of the designated snapshot ID as a target (S1402).

Next, the difference presence/absence management program 401 responses the data difference presence/absence that is a process result of the difference presence/absence check process (S1403).

The virtual volume management program 303 receives the data difference presence/absence from the storage system 102 (S1404) and determines whether there is a data difference in the LBA of the snapshot of the difference check target (S1405).

As a result, when there is a data difference in the LBA of the snapshot of the difference check target (S1405: YES), the virtual volume management program 303 causes the data copy program 307 to designate the snapshot of the difference check target to be the copy source, LBA having the data difference, and the LBA of the virtual volume 109 to be the copy destination, instructs the storage system 101 to copy the data of the designated LBA (difference data) (S1406), and waits for all data copy completion (S1407). When the data copying is completed, the process ends.

Meanwhile, when there is no data difference in the LBA of the snapshot of the difference check target (S1405: NO), the virtual volume management program 303 ends the process.

Next, the difference presence/absence check process of Step S1402 is described.

Figure 16:
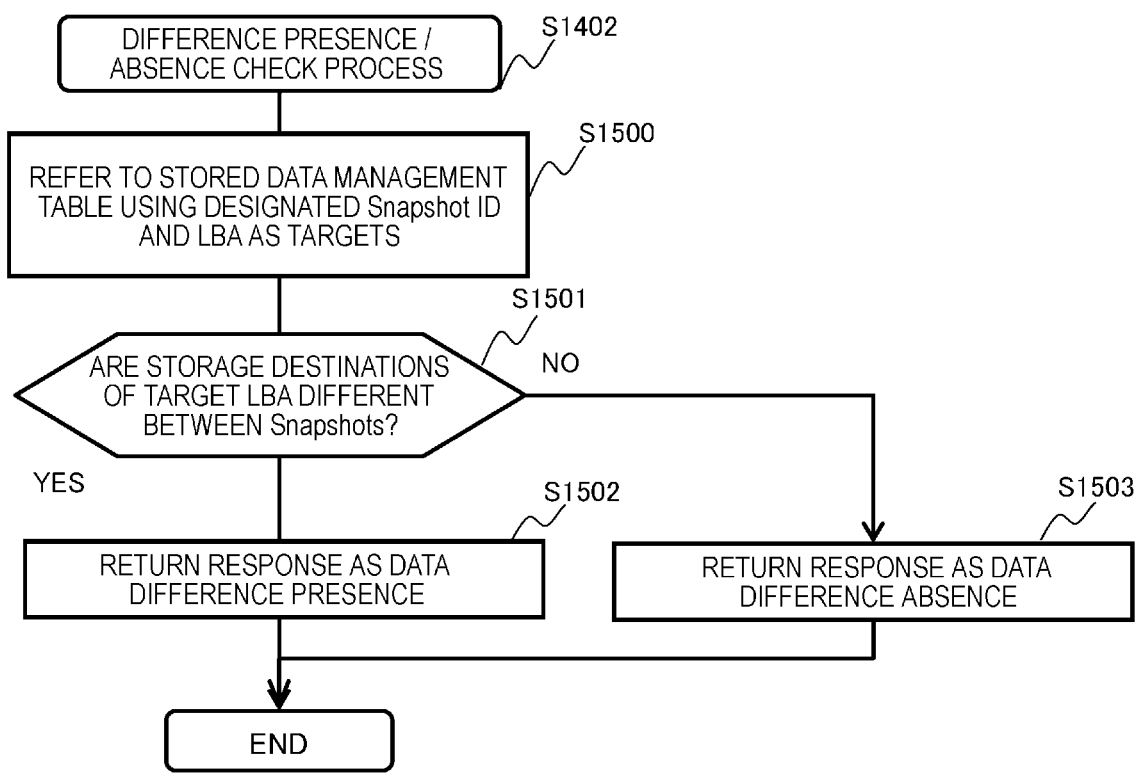
FIG. 16 is a flowchart of a difference presence/absence check process according to the first embodiment.

FIG. 16 is a flowchart of the difference presence/absence check process according to the first embodiment.

The difference presence/absence management program 401 refers to the stored data management table 405 by using the LBA of the designated snapshot ID as a target (S1500) and determines whether the storage destination storage device ID 703 of the LBA as a target (target LBA) and the value of the storage destination LBA 704 are different between snapshots before and after the switching (S1501).

As a result, when it is determined that the storage destinations of the target LBA are different between the snapshots before and after the switching (S1501: YES), the difference presence/absence management program 401 returns a response that there is a data difference (S1502) and ends the process. Meanwhile, when it is determined that the storage destinations of the target LBA are not different between the snapshots before and after the switching (S1501: NO), the difference presence/absence management program 401 returns the response that there is no data difference (S1503) and ends the process.

Next, a host read process when a read request is received from the host computer 103 in the storage system 101 is described.

Figure 17:
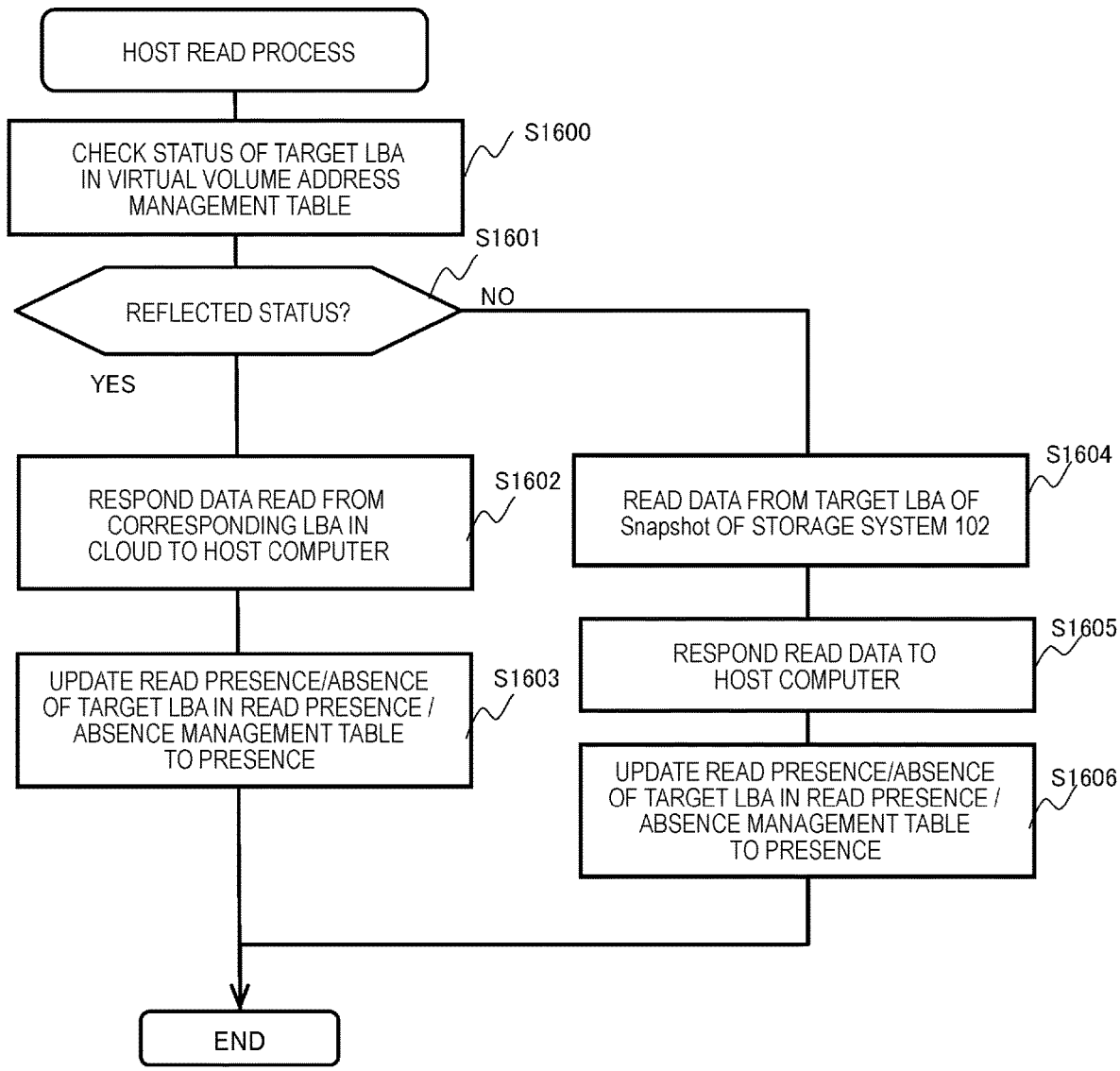
FIG. 17 is a flowchart of a host read process according to the first embodiment.

FIG. 17 is a flowchart illustrating the host read process according to the first embodiment.

When receiving the read request from the host computer 103, the host I/O process program 302 refers to the virtual volume address management table 304, checks the status of the LBA of the virtual volume in the read request (target LBA) (S1600), and determines whether the status is the reflected status (S1601).

As a result, when the status is the reflected status (S1601: YES), the host I/O process program 302 reads data from the target LBA of the storage devices 110 of the storage system 101 of the cloud 100, responds to the host computer 103 of read request source (S1602), updates the read presence/ absence of the target LBA of the read presence/absence management table 305 to presence (S1603), and ends the process.

Meanwhile, when the status is not the reflected status (S1601: NO), the host I/O process program 302 reads data from the target LBA of the snapshot of the storage system 102 (S1604), responds the read data to the host computer 103 of the read request source (S1605), updates the read presence/absence of the target LBA of the read presence/absence management table 305 to presence (S1606), and ends the process.

As described above, by the computer system 10 according to the first embodiment, when data of a certain snapshot of a certain volume is read to the storage system 101, and then data of another snapshot of the same volume is used for a process such as analysis, only data of the difference between the snapshots is read from the storage system 102 to the storage system 101. Therefore, data of a snapshot required for the process can be quickly acquired by the storage system 101, and time until the completion of the process can be shortened.

Next, a computer system 10A according to a second embodiment is described. Note that, in the description of the second embodiment, the same function or process as in the computer system 10 according to the first embodiment is denoted by the same reference numeral.

Figure 18:
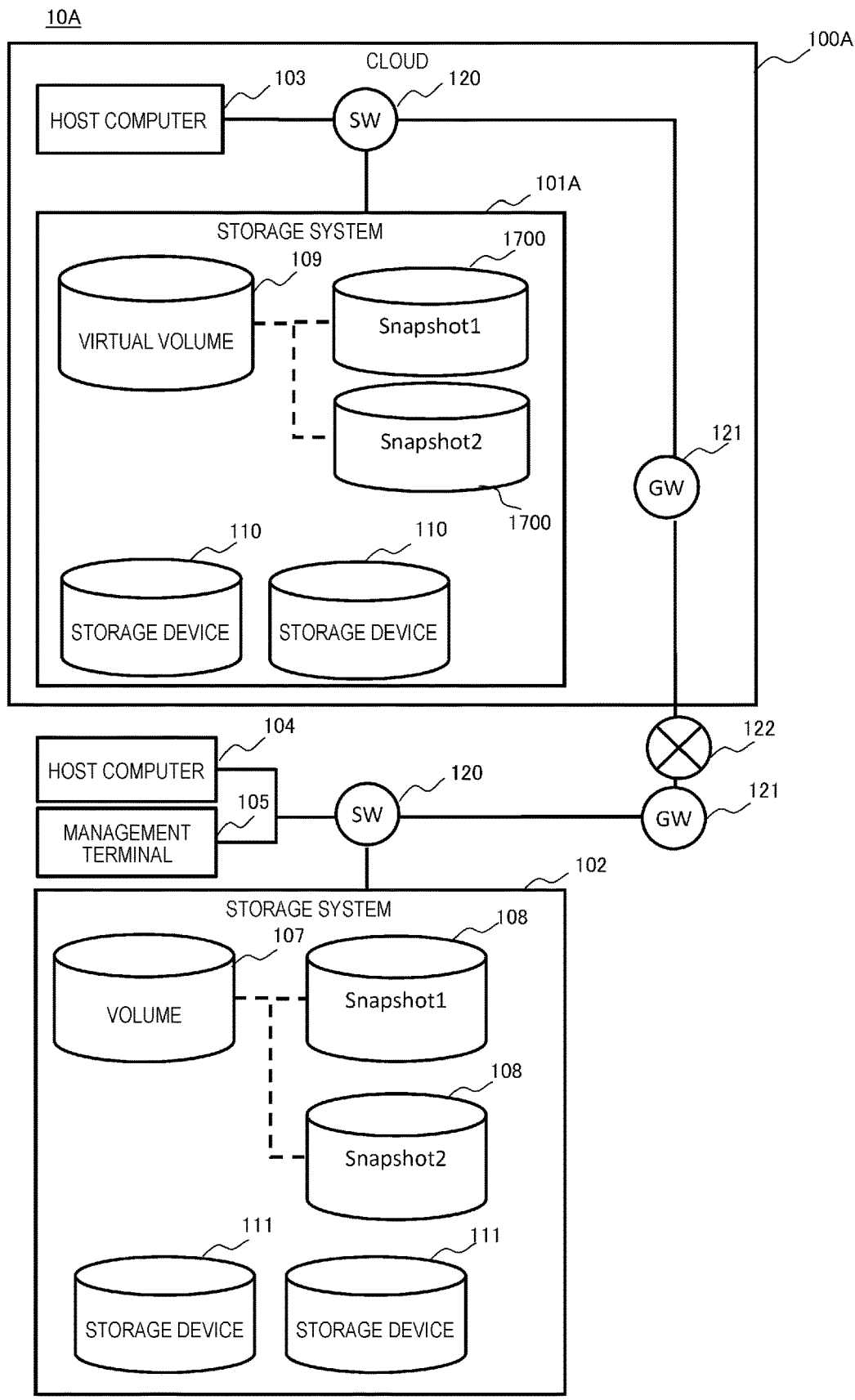
FIG. 18 is an overall schematic diagram of a computer system according to a second embodiment.

FIG. 18 is an overall schematic diagram of a computer system according to the second embodiment.

The computer system 10A includes a storage system 101A in a cloud 100A, instead of the storage system 101.

The storage system 101A includes the virtual volume 109 and one or more storage devices 110. The virtual volume 109 stores data used for the process of the host computer 103. The storage area of the virtual volume 109 is based on a storage area of the storage device 110 of the storage system 101 or a storage area of another storage system (the storage system 102). In the present embodiment, the storage system 101A indicates a predetermined state of the virtual volume 109 and manages one or more snapshots (snapshot volumes) 1700.

Next, a configuration of a memory of the cloud-side storage system 101A is described.

Figure 19:
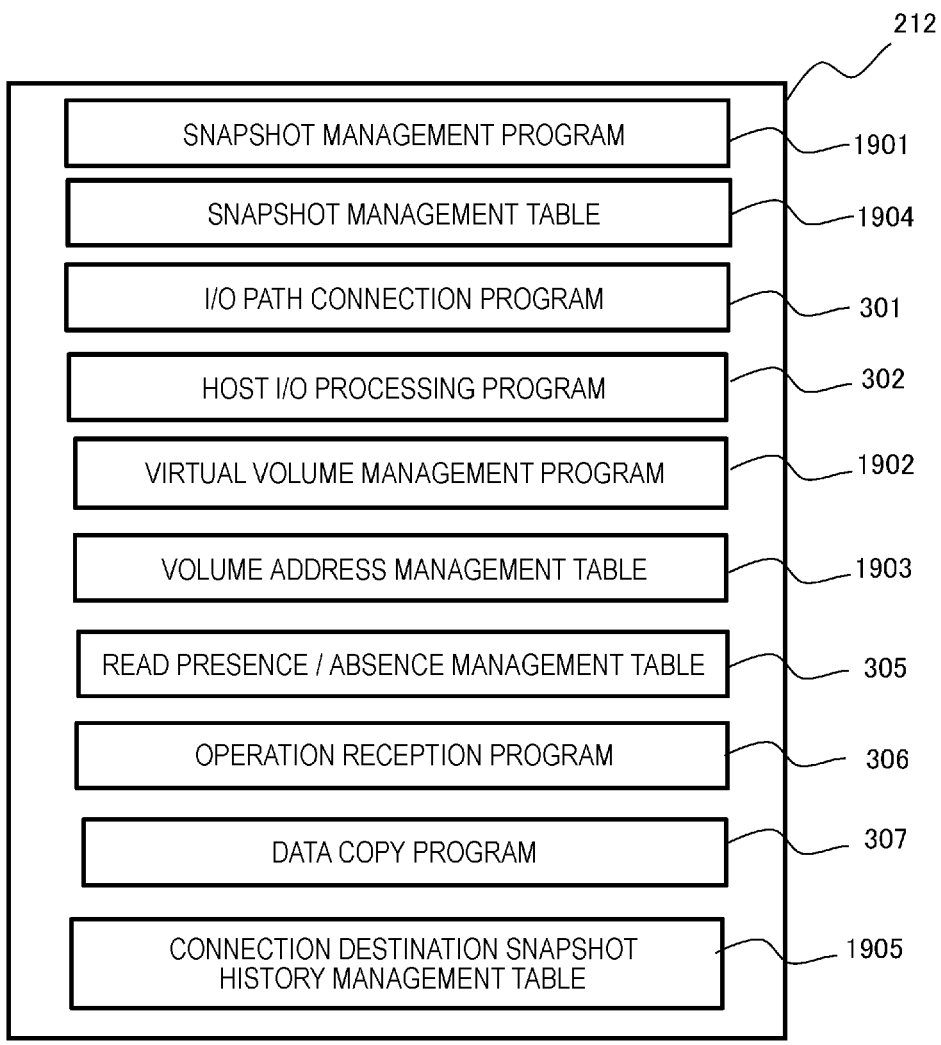
FIG. 19 is a configuration diagram of a memory of a cloud-side storage system according to the second embodiment.

FIG. 19 is a configuration diagram of a memory of a cloud-side storage system according to the second embodiment.

The memory 212 of the storage system 101A on the cloud 100A side stores a snapshot management program 1901, a snapshot management table 1904, the I/O path connection program 301, the host I/O process program 302, a virtual volume management program 1902, a volume address management table 1903, the read presence/absence management table 305, the operation reception program 306, the data copy program 307, and a connection destination snapshot history management table 1905.

The snapshot management program 1901 is executed by the CPU 211 to create a snapshot in the virtual volume 109 and manage the snapshot management table 1904.

The snapshot management table 1904 is a table for managing the snapshot of the virtual volume and stores entries per snapshot of each virtual volume. A configuration of the entry of the snapshot management table 1904 is the same as the snapshot management table 406.

The virtual volume management program 1902 is executed by the CPU 211 and performs a process of managing the virtual volume (virtual volume management process) and the like. In addition, a part of processes is different from that of the virtual volume management program 303 according to the first embodiment.

Next, the volume address management table 1903 is described.

FIG. 20 is a diagram illustrating a state after acquisition of data of the second snapshot of a volume address management table according to the second embodiment.

The volume address management table 1903 is a table for managing storage destinations of data of the storage areas of the volume in a predetermined size (for example, for 256 logical blocks) and stores entries per storage area of the volume in a predetermined size (for example, for 256 logical blocks). A part of fields of the entry of the volume address management table 1903 is different from that of entry of the virtual volume address management table 304. Note that the same field is denoted by the same reference numerals.

The entries of the volume address management table 1903 include fields of a volume type 2000, an ID 2001, the LBA 502, the status 503, the storage destination type 504, the storage destination ID 505, and the storage destination LBA 507.

In the volume type 2000, types of volumes corresponding to the entries are stored. Examples of the types of the volume include a virtual volume or a snapshot indicating a snapshot volume. In the ID 2001, IDs of the volumes corresponding to the entries (volume IDs) are stored.

For example, when data of the second snapshot with respect to the volume is acquired by the storage system 101, the volume address management table 1903 is in the state as illustrated in FIG. 20. For example, the entry on the first row indicates that the volume type is a snapshot, the data of which the range of the LBA of the volume (snapshot volume) having the volume ID of 2 is 0 to 255 is reflected to the storage device 110 of the storage system 101, the storage destination type is the storage device, that is the storage device of the storage system 101, the storage destination ID is 1, and the logical block address of storage destination is 0 to 255.

Next, the connection destination snapshot history management table 1905 is described.

FIG. 21 is a configuration diagram of a connection destination snapshot history management table according to the second embodiment.

The connection destination snapshot history management table 1905 is a table for managing snapshots of the storage system 102 that is the connection destination of the snapshot of the storage system 101A and stores the entries per snapshot. The entries of the connection destination snapshot history management table 1905 include fields of a snapshot ID 2101, the connection destination storage 902, and the connection destination snapshot ID 903.

In the snapshot ID 2101, an ID of a snapshot corresponding to the entry is stored.

Next, the user operation procedure when the computer system 10A is used is described.

Figure 22:
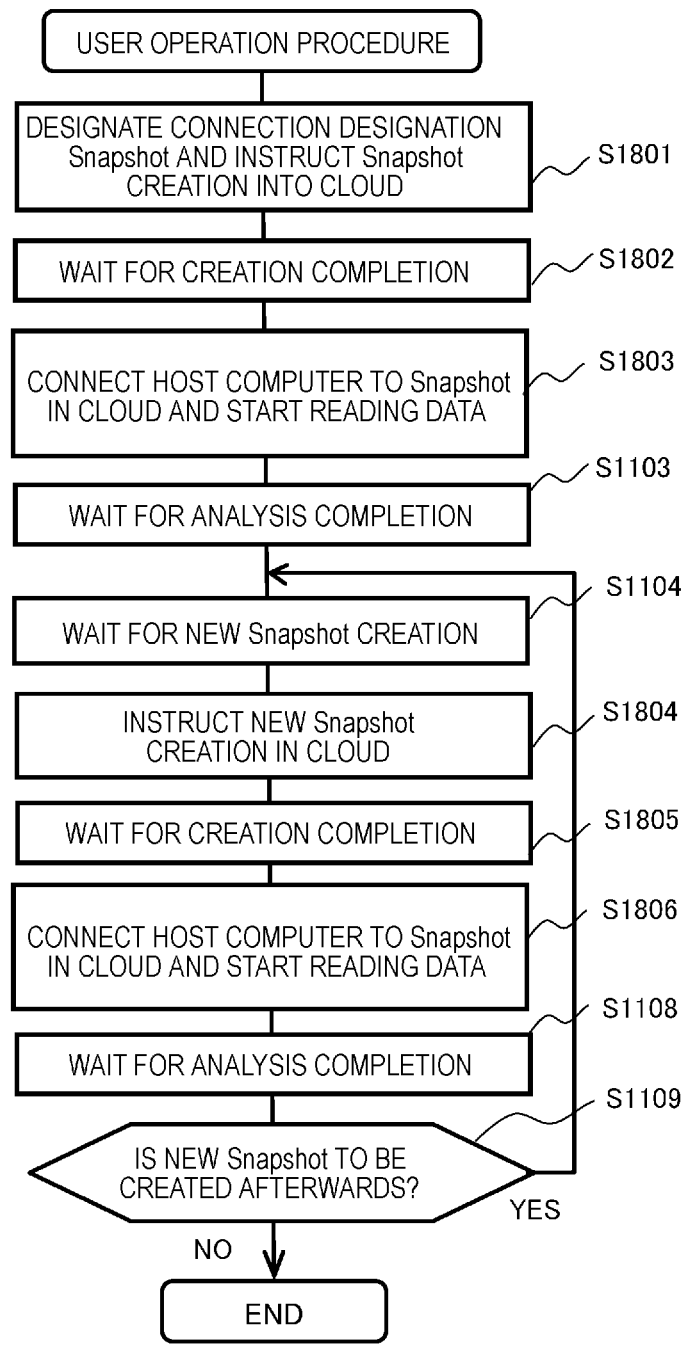
FIG. 22 is a flowchart of a user's operation procedure in using the computer system according to the second embodiment.

FIG. 22 is a flowchart of a user operation procedure in using the computer system according to the second embodiment. Note that the same process as in the flowchart of the user operation procedure in using the computer system according to the first embodiment as illustrated in FIG. 12 is denoted by the same reference numeral.

First, the user designates a snapshot of a connection destination of the storage system 102 to the management terminal 105 and instructs the creation of the snapshot into the cloud 100A (S1801). In contrast, the management terminal 105 transmits the snapshot creation instruction including the designation of the snapshot of the connection destination (acquisition instruction) to the storage system 101A.

The user waits for the response of the creation completion from the storage system 101A to the management terminal 105 (S1802).

Next, when the response of the creation completion is returned, the management terminal 105 connects the host computer 103 used for the analysis process to the snapshot created in the storage system 101A, and the host computer 103 starts reading of data from the snapshot of the storage system 101A and execute the analysis process (S1803).

In Step S1804, the user designates to the management terminal 105, an ID of the snapshot (snapshot ID) to be the analysis target of the storage system 102 (connection destination snapshot) and an ID of the previously created corresponding snapshot (snapshot ID) in the storage system 101A and instructs the creation of a new snapshot into the cloud 100A (S1804). In contrast, the management terminal 105 transmits the snapshot ID of the snapshot of the connection destination and the snapshot creation instruction including the designation of the snapshot ID of the previously created snapshot to the storage system 101A.

The user waits for the response of the creation completion from the storage system 101A to the management terminal 105 (S1805).

Next, when the response of the creation completion is returned, the management terminal 105 connects the host computer 103 used for the analysis process to the snapshot created in the storage system 101A, and the host computer 103 starts reading of data from the snapshot and executes the analysis process (S1806).

Next, the virtual volume management process is described. The virtual volume management process is executed when the operation reception program 306 of the storage system 101A receives the snapshot creation instruction from the management terminal 105.

Figure 23:
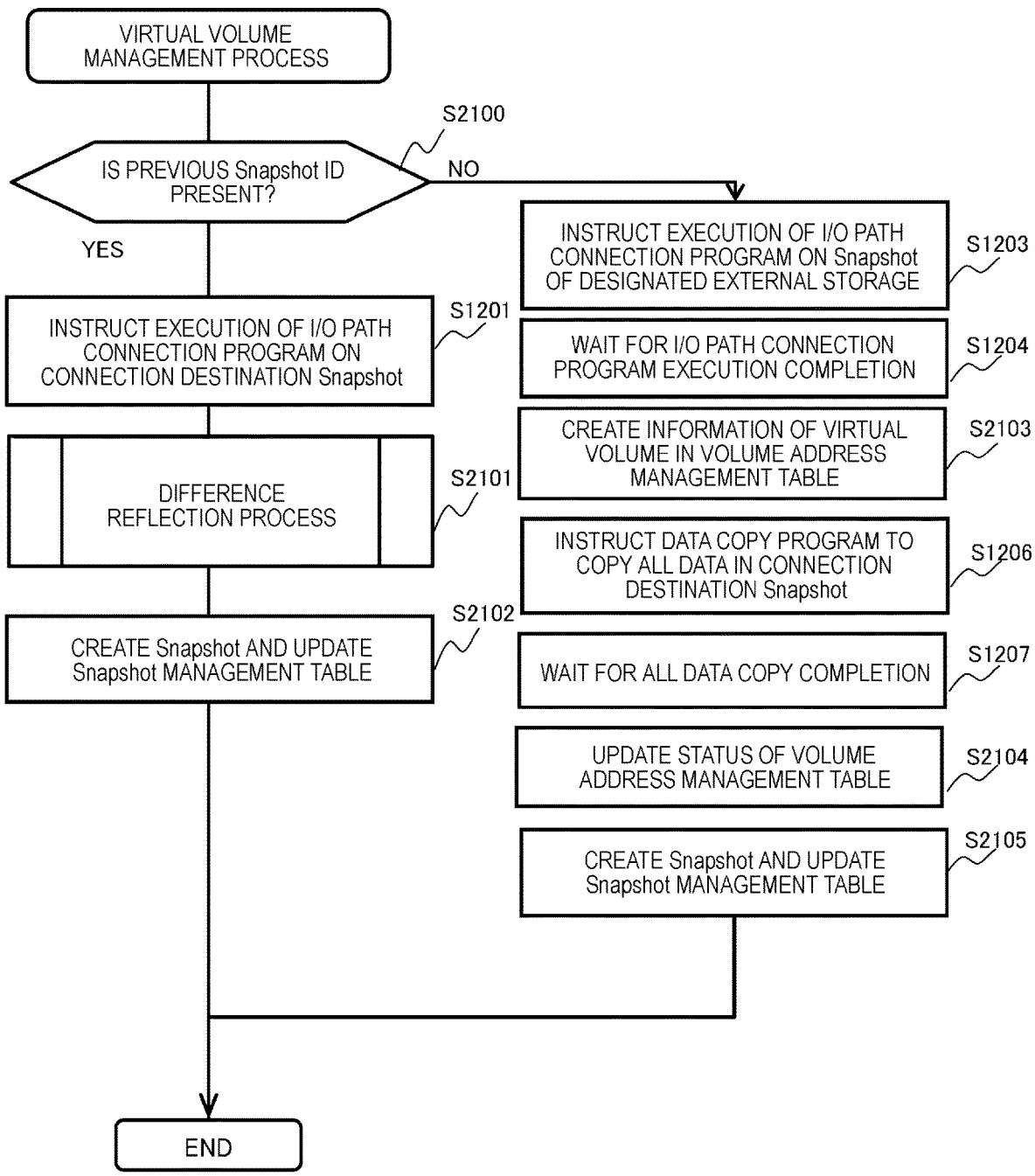
FIG. 23 is a flowchart of a virtual volume management process according to the second embodiment.

FIG. 23 is a flowchart of the virtual volume management process according to the second embodiment. Note that the same step as in the virtual volume management process according to the first embodiment as illustrated in FIG. 13 is denoted by the same reference numerals.

The virtual volume management program 1902 of the storage system 101A (strictly speaking, the CPU 211 that executes the virtual volume management program 1902) determines whether a snapshot ID of the previously created snapshot designated in the connection destination snapshot history management table 1905 is present (S2100).

As a result, when the snapshot ID of the previously created snapshot is present (S2100: YES), the virtual volume management program 1902 proceeds the process to Step S1201. When the snapshot ID of the previously created snapshot is not present (S2100: NO), the process proceeds to Step S1203.

After Step S1201, the virtual volume management program 1902 refers to the connection destination snapshot history management table 1905, specifies the entry corresponding to the snapshot ID of the previously created snapshot, specifies the snapshot ID of the snapshot of the previous (before switching) connection destination from this entry, designates the snapshot ID of the snapshots before and after the switching, and executes the difference reflection process (see FIG. 14) (S2101).

When the difference reflection process ends, the virtual volume management program 1902 creates the snapshot of the virtual volume to which the difference is reflected, updates the snapshot management table 1904 (S2102), and ends the process. In Step S2102, specifically, the virtual volume management program 1902 creates an entry of the created snapshot in the snapshot management table 1904 and registers an ID of the virtual volume of the creation source of the snapshot, the ID of the snapshot, and the creation date and time to the entry.

In Step S2103, the virtual volume management program 1902 creates information of the virtual volume that stores the data of the snapshot in the volume address management table 1903.

In Step S2104, when all data copy is completed, the virtual volume management program 1902 updates the fields of the volume address management table 1903. Specifically, the virtual volume management program 1902 changes the status 503 of the entry of the virtual volume to the reflected status, changes the storage destination type 504 to the storage device, and updates the storage destination volume 506 to the storage device 110 of the storage system 101A.

Next, the virtual volume management program 1902 creates the snapshot of the virtual volume in which data of the designated snapshot is stored, registers the information of the created snapshot to the snapshot management table 1904 (S2105), and ends the process. Specifically, in Step S2105, the virtual volume management program 1902 creates an entry of the created snapshot in the snapshot management table 1904 and registers the ID of the virtual volume of the creation source of the snapshot, the ID of the snapshot, and the creation date and time to the entry.

According to the embodiment described above, data of the snapshots read from the storage system 102 to the storage system 101 can be stored and maintained in the storage system 101 as respective snapshots. Therefore, when the same snapshots are used afterwards, the snapshots are not required to be read from the storage system 101 again and can be used for the process quickly.

Next, a computer system according to a third embodiment is described. Note that the computer system according to the third embodiment is different from the computer system 10 according to the first embodiment in the difference reflection process. For the sake of convenience, functional units of the computer system according to the third embodiment are described using the same reference numerals as those of the same or corresponding configurations of the computer system 10 according to the first embodiment.

The difference reflection process according to the third embodiment is described.

Figure 24:
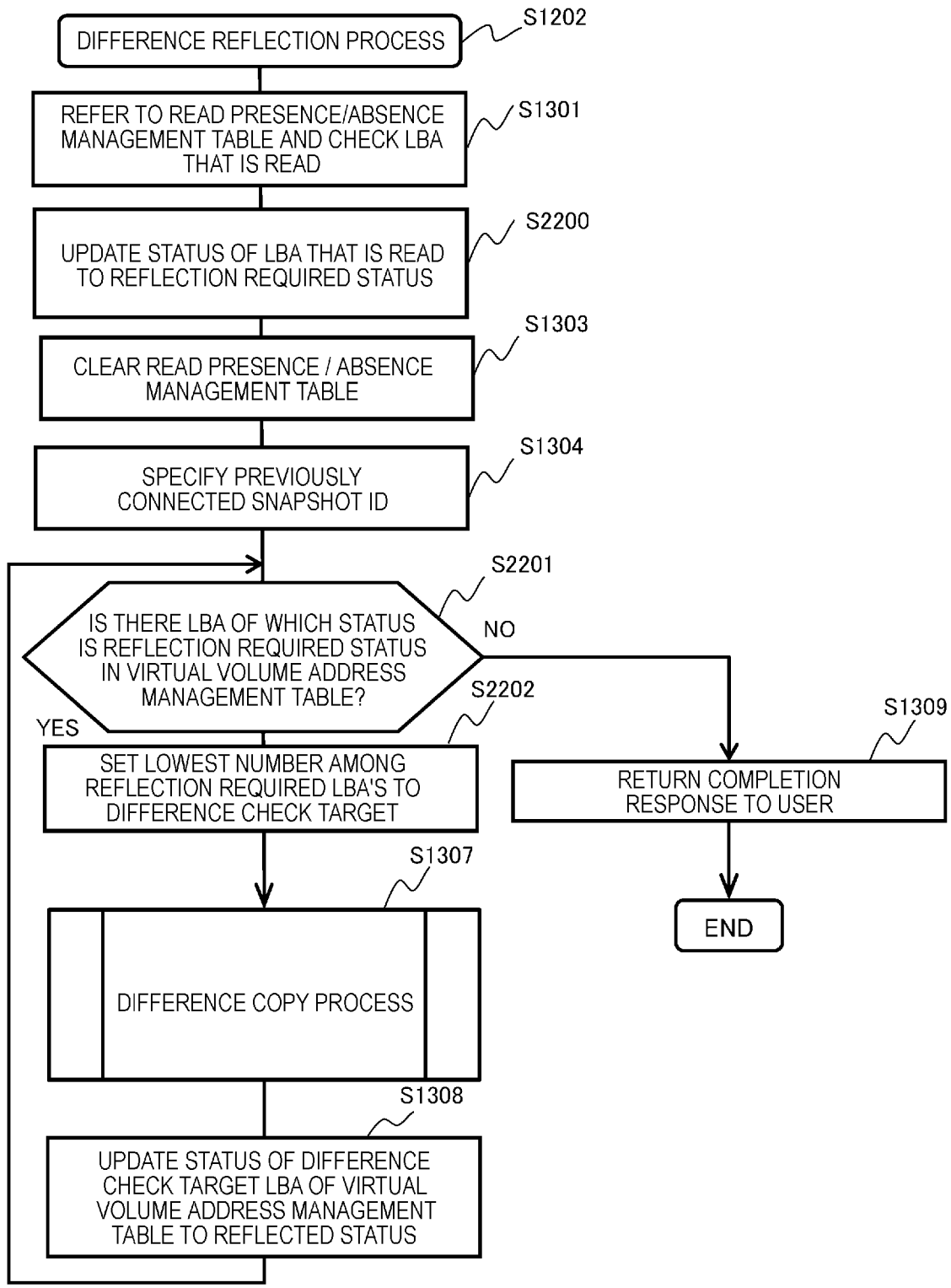
FIG. 24 is a flowchart of a difference reflection process according to a third embodiment.

FIG. 24 is a flowchart of the difference reflection process according to the third embodiment. Note that the same step as in the difference reflection process illustrated in FIG. 14 is denoted by the same reference numeral.

The virtual volume management program 303 refers to the read presence/absence management table 305, checks the LBA that is read (S1301), and updates the status 503 to the reflection required status in the entry corresponding to the read LBA of the designated virtual volume of the virtual volume address management table 304 (S2200).

After Step S1304, the virtual volume management program 303 determines whether there is an entry of the LBA of which the status 503 is set to the reflection required status, among the entries of the designated virtual volume of the virtual volume address management table 304 (S2201).

As a result, when there is an entry of the LBA of which the status 503 is set to the reflection required status (S2201: YES), the virtual volume management program 303 sets an LBA having the lowest number among the LBAs that are set to the reflection required status to a target for checking the difference from the data of the same LBA of the snapshot before switching (difference check target) (S2202).

Meanwhile, when there is no entry of the LBA of which the status 503 is set to the reflection required status (S2201: NO), it means that the difference of the data corresponding to all LBAs that are read is reflected to the snapshot before switching, and thus the virtual volume management program 303 returns a response of the copy completion to the management terminal 105 of the user (S1309), and ends the process. Accordingly, the user can start the analysis process using the data of the snapshot after switching.

Here, when the analysis process is performed on the respective snapshots to the same volume, there may be cases where many processes are performed by using data of the same area. That is, in the analysis process, the same range as the range that is read in a certain snapshot is the range that is read in another snapshot. In such a case, according to the above embodiments, a difference only in the read range is transmitted to the storage system 101, and thus a process of transmitting data in the range that is not read does not have to be performed, and thus processing resources and communication resources can be prevented from being wasted.

Note that the invention is not limited to the above embodiments and can be appropriately modified without departing from the gist of the invention.

For example, in the above embodiments, a part or all of the processes performed by the CPU may be performed by a hardware circuit. Also, the programs in the above embodiments may be installed from program sources. The program source may be a program distribution server or a recording media (for example, a portable recording media).

What is claimed is:

1. A data acquisition apparatus that acquires data from an external storage system via a network, wherein in the external storage system, a snapshot with respect to a predetermined volume is managed, the data acquisition apparatus comprising:
a processor; and a storage medium,
wherein the processor is configured to:
receive an acquisition instruction of data of a second snapshot of the predetermined volume, acquires the data of the second snapshot from the external storage system and stores the data of the second snapshot in the storage medium,
receive an acquisition instruction of data related to a whole area of a first snapshot of the predetermined volume,
inquire, of the external storage system, presence/absence of a difference between the first snapshot and the second snapshot, and
acquire data of the first snapshot related to a difference between the first snapshot and the second snapshot from the external storage system, based on a difference related to a result of the inquiry of the presence/absence of the difference, when data of the second snapshot of the predetermined volume is already acquired, and stores it in the storage medium.

2. The data acquisition apparatus according to claim 1, further comprising: a virtual volume configured by software defined storage (SDS) and a host,
wherein the data stored in the virtual volume exists on a storage device within the SDS or within a snapshot stored in the external storage system,
wherein the external storage system stores the first snapshot and the second snapshot,
wherein in a case where the SDS acquires the data of the first snapshot, and when data of the second Snapshot is further acquired, inquire of address information indicating a data difference among the first snapshot and the second snapshot and store only differential data on the storage device based on the address information, and
wherein the processor is configured to inquire of the external storage system presence/absence of the difference between the first snapshot and the second snapshot when switching a snapshot to be provided from the second snapshot to the first snapshot.

3. A data acquisition apparatus that acquires data from an external storage system via a network, wherein in the external storage system, a snapshot with respect to a predetermined volume is managed, the data acquisition apparatus comprising:
a processor, the processor configured to:
receive an acquisition instruction of data of a first snapshot of the predetermined volume,
inquire, of the external storage system, presence/absence of a difference between the first snapshot and the second snapshot when data of the second snapshot of the predetermined volume is already acquired, and
acquire at least a part of data of the difference between the first snapshot and a second snapshot from the external storage system, based on an inquiry result of the presence/absence of the difference,
manage a read presence/absence of data for each of a plurality of predetermined areas of the second snapshot acquired by the data acquisition apparatus,
inquire the external storage system of the presence/absence of the difference of data of the first snapshot by giving priority to a read presence area of the second snapshot over a read absence area, when an acquisition instruction of the data of the first snapshot of the predetermined volume is received, and
acquire difference data corresponding to the read presence area of the second snapshot, which is data of the first snapshot, from the external storage system, in priority.

4. The data acquisition apparatus according to claim 3, wherein, when difference data from the first snapshot in all read presence areas of the second snapshot is acquired from the external storage system, the processor is configured to respond to a request source of the acquisition instruction of data of the first snapshot.

5. The data acquisition apparatus according to claim 3, wherein, after difference data in all read presence areas of the second snapshot is acquired, the processor is configured to inquire the external storage system of the presence/absence of the difference from data of the first snapshot in a read absence area of the second snapshot, and
acquire difference data corresponding to the read absence area of the second snapshot, if any, from the external storage system.

6. The data acquisition apparatus according to claim 3, wherein the processor does not acquire difference data corresponding to a read absence area of the second snapshot, from the external storage system.

7. The data acquisition apparatus according to claim 3, wherein, in case of receiving a read request to the data of the first snapshot, the processor is configured to:
return the acquired data to the read request source, when data of a target area of the read request is already acquired, and acquire data of the target area of the read request of the first snapshot from the external storage system and return the data to the read request source, when data of the target area of the read request is not acquired.

8. The data acquisition apparatus according to claim 1,
wherein the processor is configured to reflect the acquired difference data to a volume that stores data of a creation source of the second snapshot, and
create a snapshot of the volume.

9. The data acquisition apparatus according to claim 1,
wherein the network is a wide area network.

10. The data acquisition apparatus according to claim 2,
wherein the processor is configured to:
upon receiving a switching instruction of switching a snapshot destination of storing data of the virtual volume from the first snapshot to the second snapshot, switch a snapshot destination of storing data of the virtual volume from the first snapshot to the second snapshot,
inquire, of the external storage system, address information indicating a data difference between the first snapshot and the second snapshot, and
update the virtual volume with the differential data acquired from the address information.

11. The data acquisition apparatus according to claim 1, further comprising a plurality of virtual volumes,
wherein the external storage system includes a plurality of snapshots, including the first snapshot and the second snapshot.

12. The data acquisition apparatus according to claim 10,
wherein after the switch of the snapshot destination, the host is accessible for input/output.

13. A data acquisition method by a data acquisition apparatus that acquires data from an external storage system via a network, wherein, in the external storage system, a snapshot with respect to a predetermined volume is managed, the method comprising:
receiving an acquisition instruction of data of a second snapshot of the predetermined volume, acquiring the data of the second snapshot from the external storage system and storing the data of the second snapshot in a storage medium of the data acquisition apparatus;
inquiring of the external storage system presence/absence of a difference between the first snapshot and the second snapshot;
receiving an acquisition instruction of data related to the whole area of a first snapshot of the predetermined volume, and
acquiring data of the first snapshot related to a difference between the first snapshot and a second snapshot from the external storage system, based on the difference related to the inquiry results when data of the second snapshot of the predetermined volume is already acquired, and stores it in the storage medium.

* * * * *